United States Patent [19]

Malcolm

[11] Patent Number: 5,533,184
[45] Date of Patent: Jul. 2, 1996

[54] COMPUTER SYSTEM FOR DYNAMICALLY GENERATING DISPLAY SCREEN PANELS PROVIDING INTERACTIVE INTERFACES FOR APPLICATION PROGRAM STEPS

[75] Inventor: Jerry W. Malcolm, Austin, Tex.

[73] Assignee: International Business Machines Corporation, Armonk, N.Y.

[21] Appl. No.: 747,167

[22] Filed: Aug. 19, 1991

[51] Int. Cl.$^6$ .................................................. G06F 3/14
[52] U.S. Cl. ............................................................ 395/161
[58] Field of Search ................................. 395/148, 155, 395/161

[56] References Cited

U.S. PATENT DOCUMENTS 5,179,657  1/1993  Dykstal et al. ...................... 395/161 X

FOREIGN PATENT DOCUMENTS

0215246A2  7/1986  European Pat. Off. .
362115     3/1991  Japan .

OTHER PUBLICATIONS

Microsoft Windows User's Guide (Trademark of Microsoft Corporation 1990) pp. 102–127.
Microsoft Windows User's Guide (Trademark of Microsoft Corporation), 1990, pp. 145,147–154 & 156.
Software—Practice and Experience, vol. 19(4), pp. 371–391, Apr. 1989, No. 4, I. Sommerville, R. Welland, S. Potter and J. Smart, "The Eclipse User Interface".

Primary Examiner—Heather R. Herndon
Assistant Examiner—Cliff N. Vo
Attorney, Agent, or Firm—J. B. Kraft

[57]  ABSTRACT

A computer system for dynamically generating a set of display panels which will provide a user friendly interactive user interface for I/O as the steps in an application program requiring user interaction are carried out. The system involves a PC or workstation display having a display management system providing a set of rules and constraints governing the layout of each screen panel. The system stores data sufficient to support each of a plurality of basic screen panels. As the program proceeds and each of the program steps is carried out, the system modifies the data supporting a selected one of the basic panels to provide the modified screen panel required for the user interface with respect to each particular application program step. The modification of each particular screen panel is based at least in part on data entered into the system through interfaces provided by the screen panel required for previous steps in the application program. The modification involves at least in part the calculation of the orthogonal coordinates of components or elements in the particular screen layout.

12 Claims, 5 Drawing Sheets

BUILD TIME

RUN TIME

COMPUTER SYSTEM FOR DYNAMICALLY GENERATING DISPLAY SCREEN PANELS PROVIDING INTERACTIVE INTERFACES FOR APPLICATION PROGRAM STEPS

CROSS REFERENCE TO RELATED APPLICATIONS

This application is related in subject matter to my following applications filed concurrently herewith and assigned to a common assignee:

Application Ser. No. 07/747,169, filed Aug. 19, 1991, now abandoned, entitled "Creating Multiple Versions of Panels from a Single Panel Definition File" hereby incorporated by reference;

Application Ser. No 07/747,168, filed Aug. 19, 1991now U.S. Pat. No. 5,416,903, entitled "A System and Method for Supporting Multilingual Translations of a Windowed User Interface" hereby incorporated by reference; and, Application Ser. No. 07/747,170, filed Aug. 19, 1991, now abandoned, entitled "Automatic Program Documentation" hereby incorporated by reference.

TECHNICAL FIELD

This invention relates to a computer system for providing a sequence of display panels which serve as the interactive interface to provide I/O to the user of an application program.

BACKGROUND OF THE INVENTION

Commencing with the introduction of the personal computer over a decade ago followed by the development of higher and higher function stand-alone workstations over the subsequent years, the user constituency has dramatically changed. From a relatively small number of computer and program literate users, the number of computer users throughout the industrial world has increased several orders of magnitude to include rapidly increasing groups in all fields of endeavor, e.g. students even at the elementary school level, small store owners, truckers, as well as professionals in virtually all fields e.g. doctors, accountants, designers of various products etc.

Relatively few of these users have a great interest in computers except for what it can do for them as a tool in carrying out their professional or other functions. Consequently, their computer literacy level may be expected to be at a relatively low point. Recognizing this situation, the computer industry has been striving to make the interfaces between such users having only casual computer interests and the application programmed computer to be as user friendly (i.e., simple as possible).

The application program orchestrates the PC or workstation computer to perform the combination of functions or jobs which the user needs it to perform. The interactive display screen has traditionally been the means through which the user provides his input to the application program and the application program provides its output to the user. Originally, this interface was a relatively complex one requiring a user who was computer literate. He had to be familiar with the exact instructions needed to input or extract data from the application program. However, with the proliferation of PC and workstation users who were not very computer literate, the trend has been to make the interface as user friendly as possible. Screen panels explaining simply every I/O step relative to the application program and help screen with further information were available at the touch of a key, and icons were included to increase the user's familiarity and recollection.

It followed, however, that as the interfaces became more and more friendly and simplified, the design of the sets of screen panels required for such user friendly interfaces became more and more time consuming, complex and tedious. For example, an I/O exchange with an application program which if designed for a computer literate user might consume one or two panels, could require 10 or 15 panels with layouts which are relatively complex to design when used for a user friendly interface with a user who knew little about computer languages.

It was not unusual for designers of user friendly interfaces with application programs to have to design several hundred or more screen panels in order to provide a user friendly interface with that application program. This presented a lengthy and tedious task for the display screen panel designer. He usually had to design each panel individually, almost exactly laying out each of the components in the panel along selected X,Y coordinates. This further required a fair amount of layout skills on the part of the designer in order to provide some consistency in layouts from panel to panel.

Thus, it can be seen that the creation of a set of panels used to implement the I/O interface with an application program required a considerable expenditure of resources. It often required a lengthy and tedious effort by an individual who had both considerable computer skills as well as layout and graphical skills.

SUMMARY OF THE INVENTION

The present invention provides a system and method for generating a set of display panels used to provide an interactive user interface for an application program which is not only less time consuming and complex, but also permits the use of panel designers with a very limited computer and layout/graphical skills.

In accordance with the present invention, the system and method dynamically generate each panel at the time that the panel is used (i.e., as the programming step requiring that particular screen panel as an I/O interface is carried out).

Unlike prior art technique which required each of as many as 700 or 800 panels to be created and stored prior to the execution of the application program, in accordance with the present invention, all that is stored is data supporting a plurality or set of basic screen panels. Then, when the application program is being executed, as each step is carried out, the data supporting one of the basic screen panels is modified dynamically to provide the particular screen panel required for the user interface for that particular step. Since the generation of the panel is dynamic, its layout will be, at least in part, affected by data which has been entered through interfaces provided by the screen panels used in previous application program steps. In addition, since the panels are dynamically generated as required by the programming step, programming and engineering changes in the application program are much easier to implement than in conventional systems where screen panels are already generated and stored.

The key aspect of the present invention is that the modification of the basic screen panel involves, at least in part, the calculation of the orthogonal (X,Y) coordinate of components in the screen panel layout. In other words, the system of the present invention stores data supporting screen layout without any orthogonal information. This orthogonal information is not calculated until the screen panel is being dynamically generated at such time when it is required by the program being executed.

In addition to all of the above advantages of the present invention, it offers great flexibility in making layout changes in the panels used. Because conventional screen panels were not dynamically generated at the time the program was run, changes in panel layout brought about by changes in the application program or for other reasons resulted in time consuming and laborious efforts in changing already fixed panel layouts. The advantages of the present invention is particularly noteworthy in this regard because the panel layouts are independent of the effects of text string length changes. In many panels, the length of the text strings dictates the coordinates of the panel elements. Thus, with the present invention changes in text string lengths have little effect because the coordinates are not calculated until "run-time", i.e. after changes in text length have already been made. However, in accordance with the present invention, since the panels are not fixed and are not generated until the application program is run, it is easier to make changes in basic panel definitions which are then generated at application program "run-time".

BRIEF DESCRIPTION OF THE DRAWING

The novel features believed characteristic of the invention are set forth in the appended claims. The invention itself, however, as well as other features and advantages thereof, will be best understood by reference to the following Best Mode for Carrying Out the Invention, when read in conjunction with the accompanying figures, wherein:

BEST MODE FOR CARRYING OUT THE INVENTION

The best mode for carrying out the present invention involves the use of a programmed general purpose computer particularly the stand-alone desk-type of computer such as a personal computer or workstation. For the present particular embodiment, an IBM PS/2, Model 70 having an OS/2 operating system including Presentation Manager for display management is used. The functions of the present invention may be best understood by considering them during build-time operation which will be described with respect to FIG. 7 and run-time operation which will be described with respect to the system of FIG. 8. The primary aspects of the present invention take place at build-time when the basic screen panels which are to be used for the I/O interface with the user of any selected application program are developed and at run-time when these basic panels are dynamically modified to provide the final screen panel used for the user I/O input during the actual running of the intended application program on the system at run-time.

Figure 7:
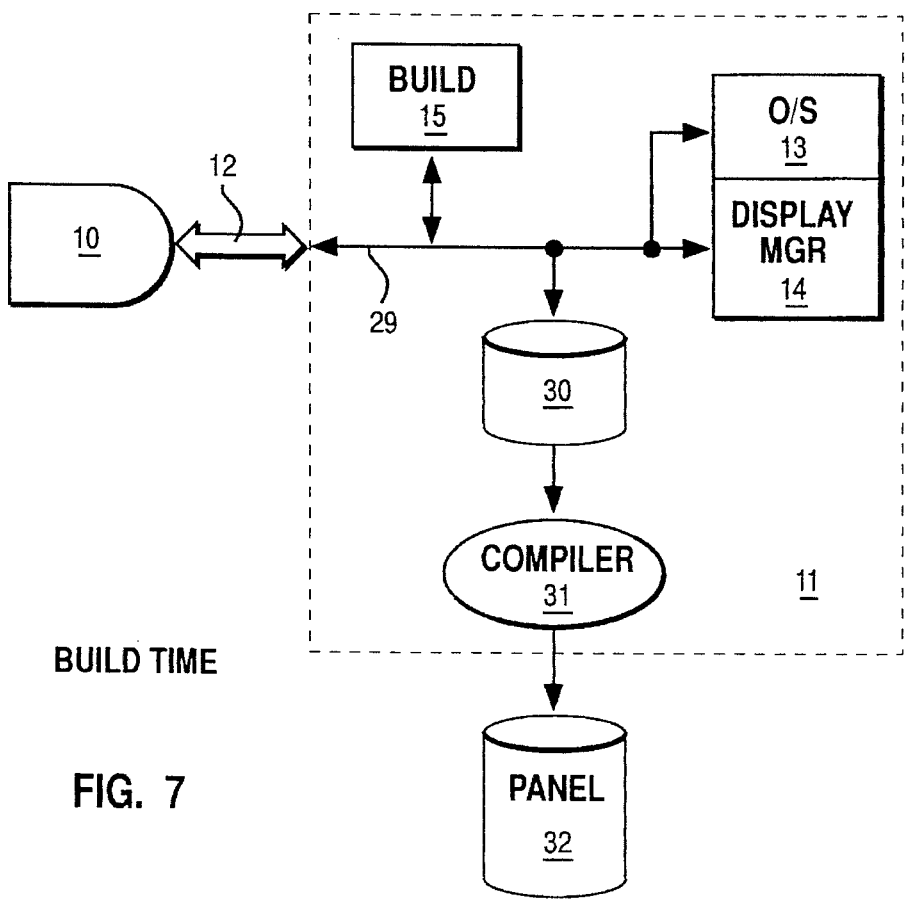
FIG. 7 is a generalized block diagram of the system of the present invention configured on a processor during panel "build-time".

Considering how the basic screen panels are developed, with reference to FIG. 7, a typical system for practicing the present invention involves display 10 providing the I/O interface to a panel designer who is going to design a series of panels appropriate to a selected application program. The display screen panels will be called subsequently during the running of the application program in order to provide the I/O to the program user appropriate to each step of the program. The display is functionally interconnected to the processor 11 through I/O bus 12. For purposes of this description, processor 11 will be considered to be an IBM PS/2, Model 70 having an operating system 13 which here is the OS/2 operating system including a display manager 14, e.g. the IBM Presentation Manager.

Now, with respect to the flow chart of FIG. 6, there will be described how the system of the present invention builds the basic screen panels which will be dynamically modified subsequently at run-time when the application program is being run to generate the final screen panels. The building of the basic panels is controlled by panel build routine 15 in processor 11. For example, assume that the application program to be practiced is one for filling out an insurance report having the general steps shown in FIG. 6. The beginning of the insurance report 16 requires the entry of seven selected items, step 17. The designer of the screen panel who has the application program before him determines that he will need a double column panel layout in order for the user to enter the seven items. He then has the system define the basic double column panel shown in FIG. 2 by invoking procedure 18 which calls instructions set forth as follows to build the panel:

---

Double Column Build Instructions

---

Begin Window Definition;
Title Bar Text is "Double Column Example".
    Subdivide Current Column
        Begin Column in Current Subdivision.
            Create checkbox;    Text is "Item 1";
                                    Identifier is "ITM1".
            Create checkbox;    Text is "Item 2";
                                    Identifier is "ITM2".
            Create checkbox;    Text is "Item 3";
                                    Identifier is "ITM3".
            Create checkbox;    Text is "Item 4";
                                    Identifier is "ITM4".
        End Current Column

| Double Column Build Instructions |  |
|---|---|
| Begin Next Column | |
| Create checkbox; | Text is "Item 5"; |
| | Identifier is "ITM5". |
| Create checkbox; | Text is "Item 6"; |
| | Identifier is "ITM6". |
| Create checkbox; | Text is "Item 7"; |
| | Identifier is "ITM7". |
| End Current Column | |
| End Current Subdivision | |
| End Window Definition. | |

Figure 1:
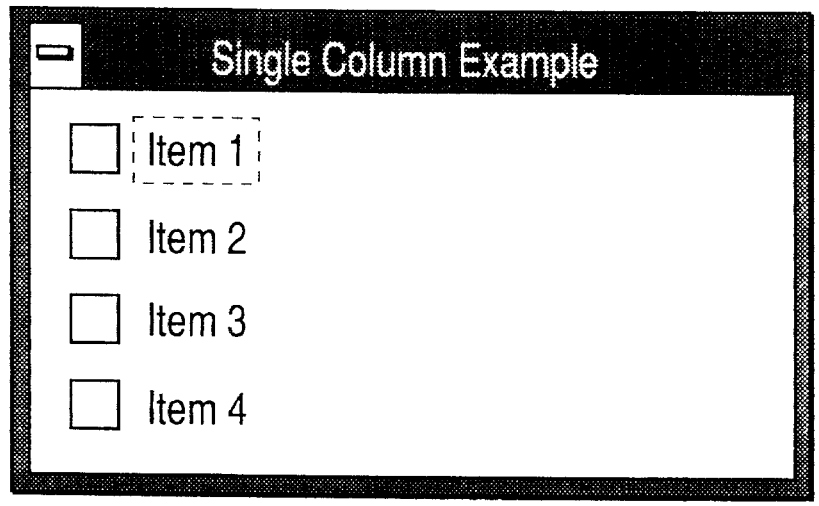
FIG. 1 is a diagram of a typical display screen panel layout which may be formed using the system of the present invention.
Figure 2:
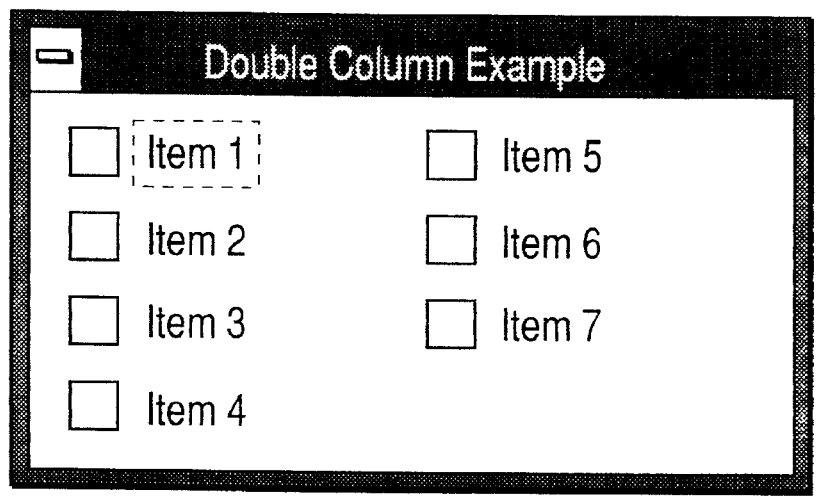
FIG. 2 is a diagram of another typical display screen panel layout which may be formed using the system of the present invention.

It should be understood that the above instructions which are shown in pseudocode could be entered into the system by the designer at the display using any standard text entry source code which describes the layout textually. Alternatively, the layout could be formed by a method involving grossly laying out elements and text on the screen using a mouse for example without any coordinate information being entered. It should be noted that from the build-instructions given above, that only the general layout is defined; the specific X,Y or orthogonal coordinates for each of the elements in FIG. 2 is not given. As will be described hereinafter, these orthogonal coordinates for the elements and text will be generated dynamically during the actual execution of the application program when the display screen panels such as those shown in FIGS. 1 through 5 will be dynamically generated as needed by the respective steps in the application program for I/O purposes.

Figure 6:
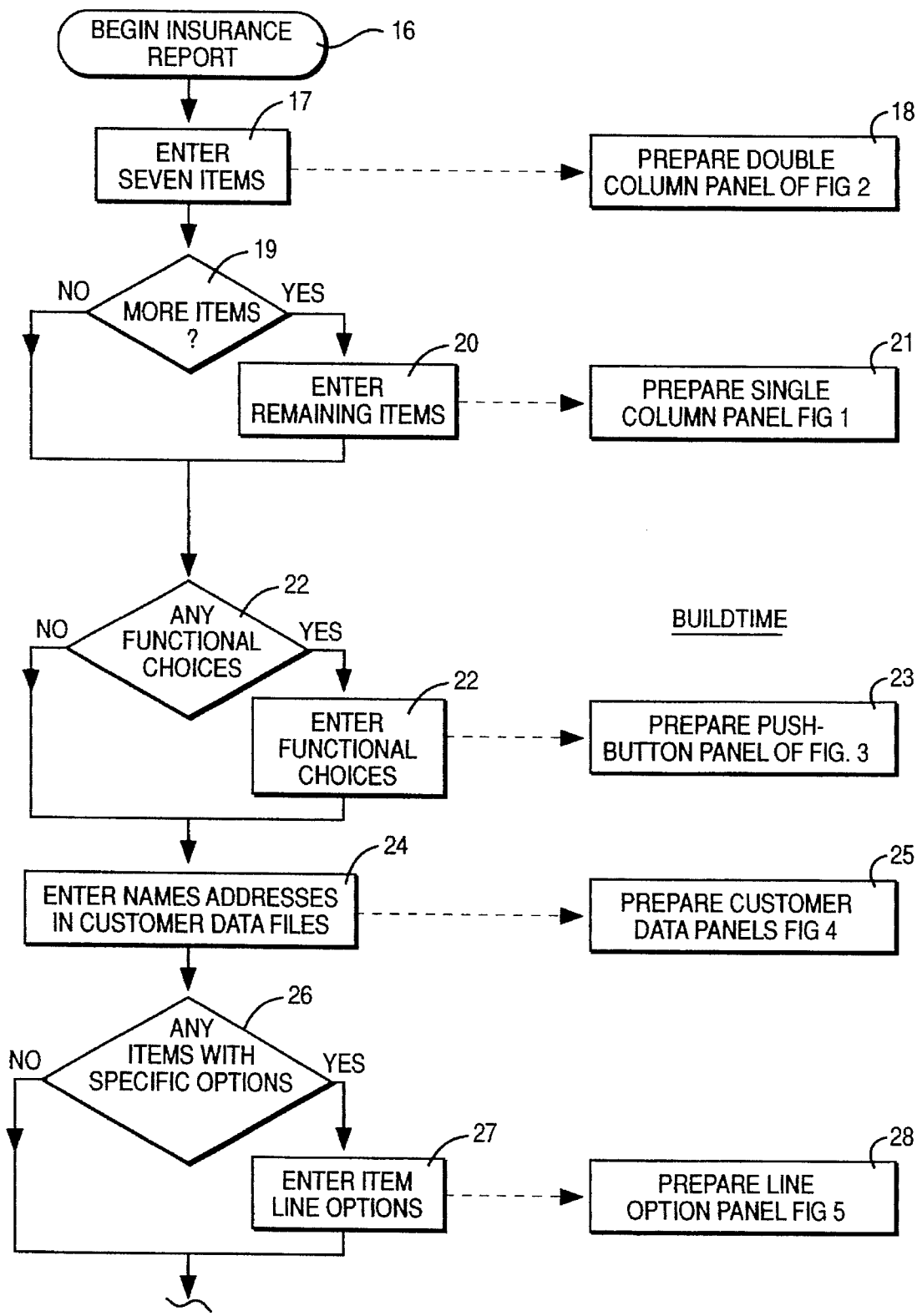
FIG. 6 is a program flowchart showing how the basic display screen panels to support the I/O stages of an application program are defined during panel "build-time".

Returning now to the application program of FIG. 6, the next step in the program is decision block 19, a determination as to whether there are any additional items to be entered. If there are, and then, step 20, the remaining items are to be entered, an appropriate panel has to be designed for the remaining items. At this point, the designer must design such a panel. For purposes of this example, let us assume that the remaining items can be entered in a single column at most and the designer proceeds to prepare a single column type of basic screen panel of the type shown in FIG. 1 through procedure 21. The pseudocode steps for preparing a basic panel supporting the single column panel of FIG. 1 is set forth as follows:

| Single Column Build Instructions |  |
|---|---|
| Begin Window Definition; | |
| Title Bar text is "Single Column Example". | |
| Create a checkbox; | Text is "Item 1"; |
| | Identifier is "ITM1". |
| Create a checkbox; | Text is "Item 2"; |
| | Identifier is "ITM2". |
| Create a checkbox; | Text is "Item 3"; |
| | Identifier is "ITM3". |
| Create a checkbox; | Text is "Item 4"; |
| | Identifier is "ITM4". |
| End Window Definition. | |

The single column basic panel is prepared in substantially the same manner as described hereinabove with respect to the double column base panel of FIG. 2.

As the application implementation in panels proceeds through step 22 of the program, a determination is made as to whether there are any functional choices which should be implemented in a push button arrangement. If there are such functional choices to be so implemented, and these choices are to be entered, step 22, designer proceeds to prepare the basic panel for the push button panel of FIG. 3 through procedure 23. This is done through a series of build instructions in accordance with the following pseudocode procedure:

| Push Button Build Instructions |  |
|---|---|
| Begin Window Definition with Title of "Push Button Example" | |
| Create checkbox; | Text is "Item 1"; |
| | Identifier is "ITM1". |
| Create checkbox; | Text is "Item 2"; |
| | Identifier is "ITM2". |
| Create checkbox; | Text is "Item 3"; |
| | Identifier is "ITM3". |
| Create checkbox; | Text is "Item 4"; |
| | Identifier is "ITM4". |
| Create an "OK" Push Button in Function Key Area at Bottom of Panel | |
| Create a "Cancel" Push Button in Function Key Area at Bottom of Panel and Make it the Default | |
| Create a "Help" Push Button in Function Key Area at Bottom of Panel | |
| End Window Definition. | |

As the implementation of appropriate panels for the application program of FIG. 6 proceeds, step 24 requires customer data files with names and addresses for the above items. The panel designer, following procedure 25, must prepare the basic customer data panel shown in FIG. 4 for this purpose. He does so by entering instructions implementing the following pseudocode:

| Customer Data Panel Build Instructions |
|---|
| begin window definition- Title=Customer Data |
|     create entryfield- Prompt='Name' width=20. |
|     create entryfield- Prompt='Address' width=20. |
|     create entryfield- Prompt='Zip' width=7 maxcharacters=7 |
|         qualification=numeric. |
| end window definition. |

As the implementation of the program proceeds through decision step 26 where a determination is made that certain of the line items are to have a choice of options, such line item options have to be implemented in a panel arrangement so that the application program user may enter them in step 27. Thus, the designer proceeds to establish the basic screen panel for a line option panel shown in FIG. 5 through procedure 28. This is done through the following instructions with the following pseudocode procedure:

| Line Item Option Build Instructions |
|---|
| Create a Window Definition with Title Text |

Line Item Option Build Instructions

```
"Line Example"
    Begin Single Line
        Create an Entry Field;
            Prompt is "Enter Filename"
            Width is eight (8) characters
            Suffix Text is "."
            Identifier is "FNAME"
        Create an Entry Field
            Width is three (3) characters
            Identifier is "FEXT"
    End Single Line
    Begin Single Line
        Create checkbox;      Text is "First Item";
                              Identifier is "CB1".
        Create an Entry Field;
            Prompt is "Options"
            Align the Prompt at the Column
                Alignment Point
            Width is five (5) characters
            Identifier is "OPT1".
    End Single Line
    Begin Single Line
        Create checkbox;      Text is "Second Item";
                              Identifier is "CB2".
        Create an Entry Field;
            Prompt is "Options"
            Align the Prompt at the Column
                Alignment Point
            Width is five (5) characters
            Identifier is "OPT2".
    End Single Line
End Window Definition.
```

It should be understood that we have illustrated the defining or building of the basic panels for just five possibilities. In the implementation of complex application programs, there would be literally hundreds of final panels to be generated as well as hundreds of base panels supporting such final panels.

Returning now to the processor of FIG. 7, the data supporting the base panels to be used to subsequently dynamically generate the panels shown in FIGS. 1 through 5 are connected via internal bus system 29 to file storage means 30 as source code which is then compiled through any standard compiler 31 to the object code file, "panel" 32 which will provide the basic panel configurations from which the panels required when the application program is actually run to be generated. This compiler transforms the high level language source code which has been used by the panel designer into an object program file, "panel" 32 which consists of the machine executable instructions. A reference for compiler design is the text: "Principles of Compiler Design" by Ahao and Ullman published by Addison-Wesley Publishing Company, 1977.

Figure 8:
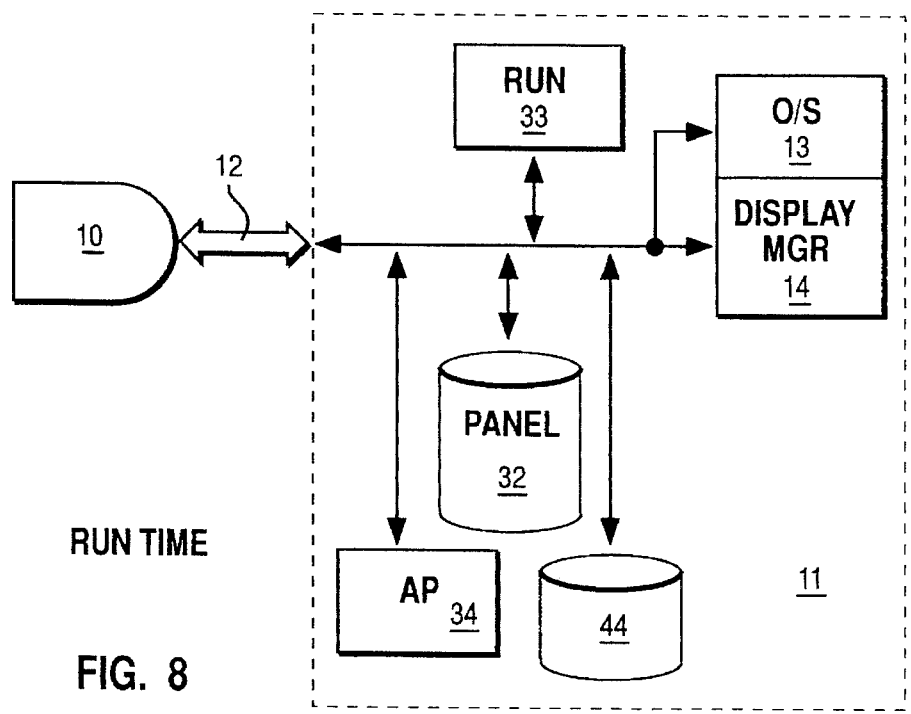
FIG. 8 is a generalized block diagram of the system of the present invention configured on a processor during "run-time".

Now, with respect to FIGS. 8 and 9, there will be described how, in accordance with the present invention, the specific panels required by the respective steps in an application program are dynamically generated at run-time i.e. when the application program is being run and thus requires the panels for its I/O interface. FIG. 8 shows a processor which for convenience is the same processor of FIG. 7 set up with appropriate components to run the application program and to dynamically generate the requisite screen panels. Display 10 and I/O bus 12 perform their functions as previously described with respect to FIG. 7 as does operating system 13 and display manager 14. The "panel" object code file 32 defining the basic screen panels required to support the application program of FIG. 7 including the panels shown in FIGS. 1 through 5 is now loaded into processor 11 of FIG. 8. Also loaded into processor 11 is a set of routines 33 which for convenience of this description will be referred to as the "run" routine for dynamically generating from the basic panel data stored in panel file 32. The display panel required for running application program 34 which is also loaded in processor 11.

Figure 9:
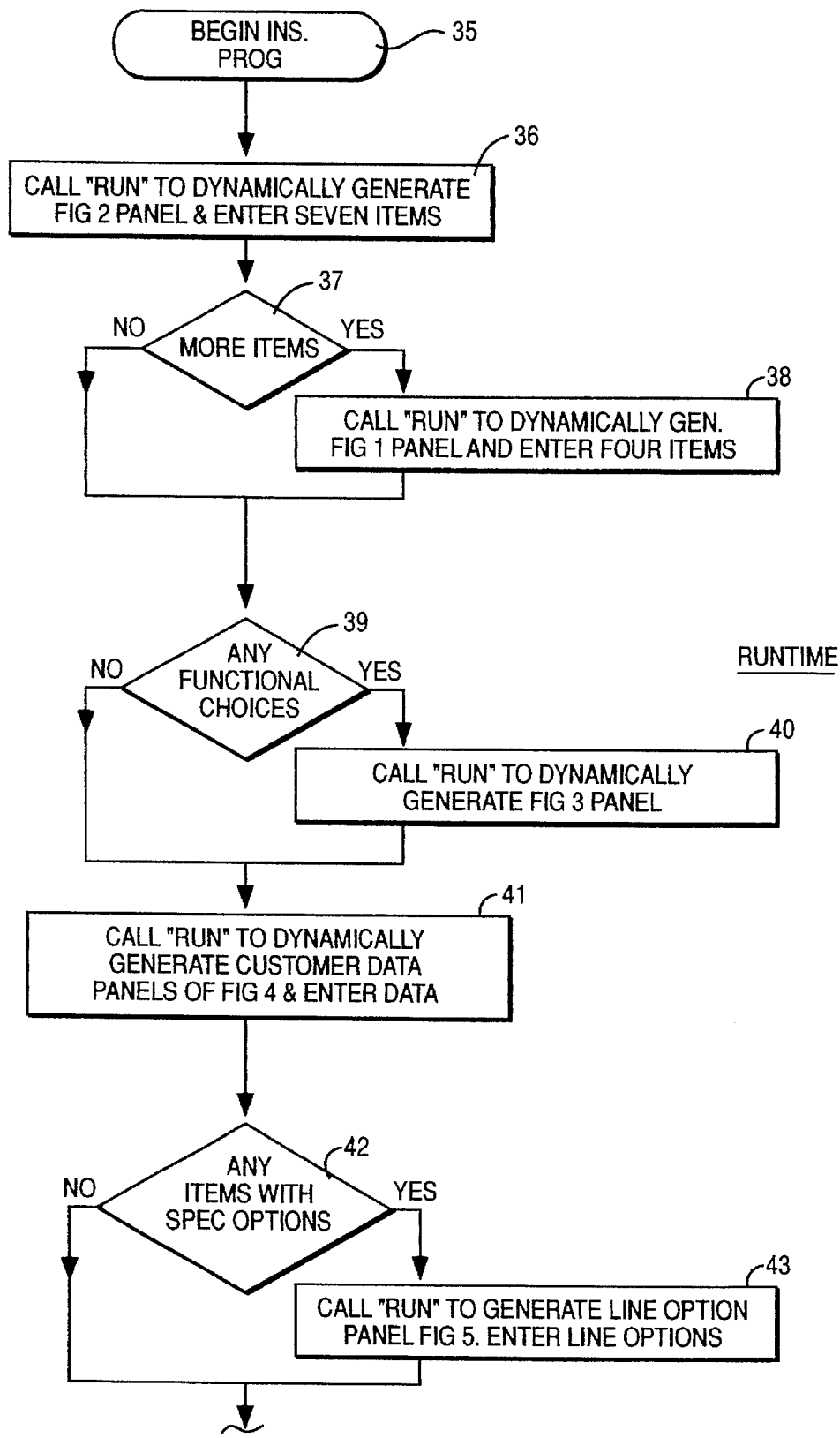
FIG. 9 is a program flowchart showing the running of an application program steps which require the dynamic generation of previously configured display screen panels.

Now with reference to the flowchart of FIG. 9, let us demonstrate how the system of the present invention operates at run-time when the panels required for the entry of data are dynamically generated. At run-time, the user or operator will run the application program and enter the required data. For purposes of this illustration, the portion of the application program being run in FIG. 9 will be the same portion as has been previously described for which basic panel configurations have already been defined (see FIG. 6).

Step 35, the insurance report application program begins to run. Since seven basic items have to be entered, according to step 36, the "run" routine is called and it dynamically generates the double column panel of FIG. 2 in the exact layout shown in FIG. 2 from the information defining the basic panel configuration built in step 18 of FIG. 6 during the previously described build-time and store in the "panel" object code file 32. In doing so, the orthogonal (X,Y) coordinates of every check box of FIG. 2 and every text item width have to be dynamically calculated as well as dynamically calculating the position and extent of the panel title. An example of how the orthogonal coordinates of these elements in the panel are calculated will be subsequently described with respect to FIG. 10. After the panel of FIG. 2 is dynamically generated, the operator enters the appropriate data for the seven items. The application program then proceeds to step 37 where a determination is made as to whether there are more items to be entered. If this is the case, and let us say four additional items have to be entered, the "run" routine is again called. The single column four item panel of FIG. 1, the basic configuration of which has been previously defined during the build-time described above with respect to procedure 21 is now dynamically generated. The operator then proceeds to make appropriate entries with respect to the four items of the panel, step 38.

The application program then proceeds to decision step 39 where a determination is made as to whether the operator is to be offered any functional choices requiring push button. If this is the case, then, step 40 the application program called the "run" routine to dynamically generate the panel shown in FIG. 3, the basic configuration of which has been previously defined or built during build-time as described in procedure 23, FIG. 6. Here again, it does so by dynamically calculating the orthogonal (X,Y) coordinates for the four items, the check boxes, the three push buttons and the title. The functional choices offered by the push buttons are now available to the operator of the application program.

Figure 3:
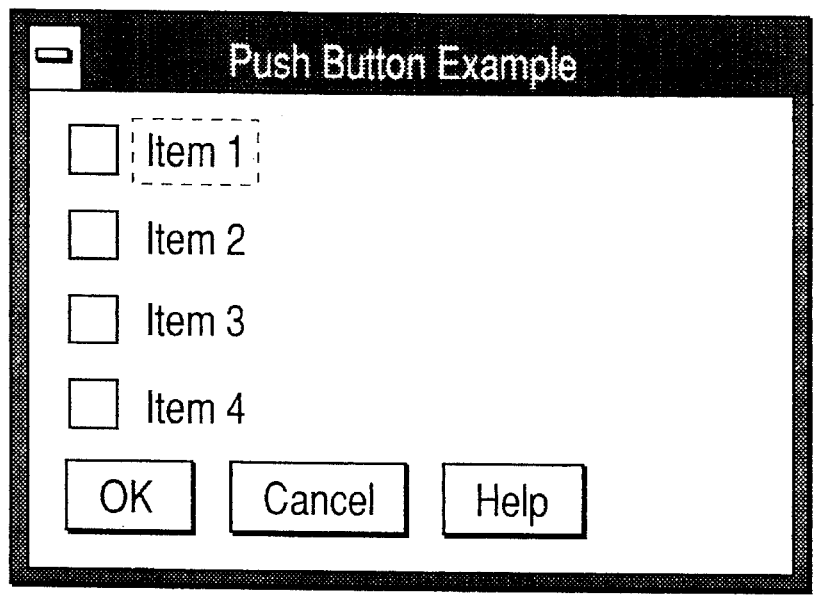
FIG. 3 is a diagram of still another display screen panel layout which may be formed using the system of the present invention.

Up to this point in the description, the primary aspect of dynamic panel generation or modification at run-time has been the calculation of the coordinate of all of the elements defined in the basic panel configuration. It should be understood, that the dynamic configuration comprehends many more implementations. For example, where the panels have one or more elements in common, a basic panel configuration supporting a plurality of potential run-time panels may be stored in "panel" file 32 and then one of several versions of that basic panel configuration dynamically generated at run-time. This implementation is more completely described and covered in my co-pending application entitled "Creating Multiple Versions of Panels from a Single Panel Definition File", application Ser. No. 07/747,169, filed concurrently herewith on Aug. 19, 1991 (Applicant's docket number AT9-91-049). For example, the panels of FIGS. 1 and 3 have several common elements. A basic panel definition as shown in FIG. 3 could be stored, and then if the single column panel without push button were called for at run-time of the application program version I shown in FIG. 1 would be dynamically generated or, if a panel with functional push buttons were required, then the panel of FIG. 3 could be regarded as version II and generated at run-time. In each case, appropriate titles would have to be also generated at run-time. Similarly, the double column configuration of FIG. 2 could be stored as a basic panel definition from which single column panel of FIG. 1 would be the first version and the double column panel of FIG. 2 would be the second version.

Further, in this connection it should be noted that there may be circumstances where the modification of a particular screen panel during run-time is based at least in part on data entered into the system through interfaces provided by screen panels required for previous steps in the application program. Let us consider a variation of the case mentioned above where the layout of FIG. 2 is the basic panel definition from which the first version is the single column panel of FIG. 1 while the second version is the double column panel of FIG. 2. Let us assume that in a prior step in the running of our application program, the user is shown the panel of FIG. 5 and has to choose either the first or the second items. Should he choose the first item on this prior step, then for our present step, the first version of the basic panel will be dynamically generated and we will get a single column panel as in FIG. 1. However, if in the prior step, the operator selects the second item in FIG. 5, then the second version of the composite panel would be dynamically generated in the present step, and we would get a double column panel as in FIG. 2.

Figures 4, 5, 10:
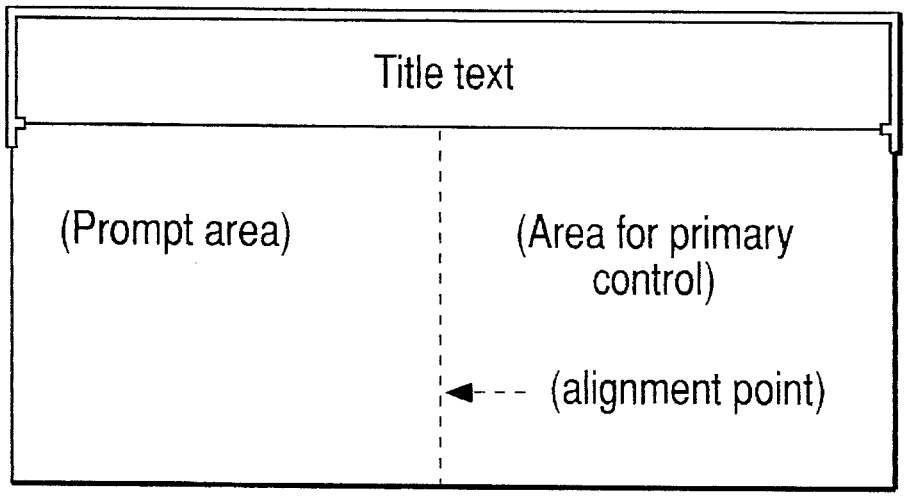
FIG. 4 is a diagram of yet another typical display screen panel layout which may be formed using the system of the present invention.
FIG. 5 is also a diagram of a typical display screen panel layout which may be formed using the system of the present invention.
FIG. 10 is a diagram of a screen panel layout chart used to reference X,Y positions during the dynamic calculation of the orthogonal coordinates of a screen panel as that panel is dynamically generated at run-time.

Returning now to the operation of the application program at run-time (FIG. 9), the next step requires the entry of customer data i.e. names and addresses; the application program calls the "run" routine to dynamically generate customer data panels of FIG. 4, step 41. The definition and configuration of the basic panels from which run-time panels are dynamically generated has been previously described with respect to procedure 25 in FIG. 6. Here again, the procedure involves the dynamic calculation of the orthogonal (X,Y) coordinates for all of the elements and boxes in FIG. 4. For purposes of illustrating how one skilled in the art may dynamically calculate the orthogonal coordinates during such a dynamic panel layout, let us consider how the previously described "Customer Data Panel Build Instruction" which defines the basic panel for layout may be translated into orthogonal coordinates for all of the elements in the panel of FIG. 4. The previously defined Customer Data Panel Build Instructions are as follows:

```
begin window definition- Title=Customer Data
    create entryfield- Prompt='Name' width=20.
    create entryfield- Prompt='Address' width=20.
    create entryfield- Prompt='Zip' width=7 maxcharacters=7
        qualification=numeric.
end window definition.
```

Now at run-time, the above build instructions are implemented to generate the elements of the panel of FIG. 4 and their orthogonal (X,Y) coordinates in accordance with the following calculation routine described in pseudocode:

```
Do for pass = 1 to 2
    do for all instructions
        if instruction is 'begin window definition' then do
            get width of title text
            add width of other title bar icons as needed
            set current max column width to calculate width
            set current Y position at 0 (upper-left 0,0 origin)
        end
        if instruction is 'create entryfield' then do
            if pass = 1 then do
                adjust alignment point to max of all current prompts
                set current max column width to alignment point plus
                    max width of all current primary controls
            end
            else (pass = 2) do
                position prompt at left margin and current Y
                position primary control at alignment point
                set current Y value to current Y value + entryfield
                    height + entryfield standard vertical spacing
            end
        end
        if instruction is 'end window definition' then do
            if pass = 2 then do
                set window height = current Y value
                set window width = current max column width
            end
        end
    end
end
```

These coordinate calculating instructions should be read with reference to FIG. 10 which is the layout guide used by the coordinate calculating instructions to generate the orthogonal coordinates of the panel of FIG. 4.

Returning once again to the running of the application program, FIG. 9, next at decision step 42, a determination is made as to whether there are any items with special line options. Since this is the case, step 43 is followed and the "run" routine is called to generate dynamically the line option panel of FIG. 5 which has been previously defined during the build-time in accordance with procedure 28 of FIG. 6. The layout and the orthogonal coordinates are dynamically calculated using the procedures described above with respect to FIG. 10 performing the customer data panel of FIG. 4.

For purposes of completeness, it should be noted that the I/O data received and put out through the panels at run-time may be stored in storage file 44.

Although the invention has been described with reference to this specific embodiment, this description is not meant to be construed in a limiting sense. Various modifications of the disclosed embodiment, as well as other embodiments of this invention, will become apparent to those persons skilled in the art upon reference to the description of this invention. It is, therefore, contemplated that the appended claims will cover any such modifications or embodiments as fall within the true scope of this invention.

I claim:

1. A computer system for dynamically generating a set of display screen panels to provide an interactive user interface to an application program having a plurality of steps comprising:

means for storing a set of rules controlling the layout of each screen panel, means for storing data defining the layout of each of a plurality of basic screen panels, means for storing said application program, means for sequentially carrying out said steps in said application program, and means responsive to the carrying out of each of said plurality of program steps for dynamically modifying the stored data defining the layout of one of said basic screen panels to provide a screen panel with the modified layout required for the user interface to said application program during said step.

2. The computer system of claim 1 wherein said modification in said screen panel layout is based in part on data entered into said system through interfaces provided by screen panels required for previous steps.

3. The computer system of claim 2 wherein said modification in said screen panel layout involves in part the calculation of the orthogonal coordinates of components in said screen panel layout.

4. The computer system of claim 1 wherein said modification in said screen panel layout involves in part the calculation of the orthogonal coordinates of components in said screen panel layout.

5. The computer system of claim 4 wherein said stored data being dynamically modified contains no orthogonal coordinate information.

6. The computer system of claim 5 wherein all of said stored data supporting said basic screen panels contains no orthogonal coordinate information.

7. A method for dynamically generating a set of computer display screen panels to provide an interactive user interface to in an application program having a plurality of steps comprising:

storing a set of rules controlling the layout of each screen panel, storing data defining the layout of each of a plurality of basic screen panels, storing said application program, sequentially carrying out said steps in said application program, and responsive to the carrying out of each of said plurality of program steps, dynamically modifying the data defining the layout of one of said basic screen panels to provide a screen panel with the modified layout required for the user interface to said application program during said step.

8. The method of claim 7 wherein said modification in said screen panel layout is based in part on data entered through interfaces provided by screen panels required for previous steps in said application program.

9. The method of claim 8 wherein said modification in said screen panel layout involves in part the calculation of the orthogonal coordinates of components in said screen panel layout.

10. The method of claim 7 wherein said modification in said screen panel layout involves in part the calculation of the orthogonal coordinates of components in said screen panel layout.

11. The method of claim 10 wherein said stored data being dynamically modified contains no orthogonal coordinate information.

12. The method of claim 11 wherein all of said stored data supporting said basic screen panels contains no orthogonal coordinate information.

* * * * *